(12) United States Patent
Han et al.

(10) Patent No.: US 11,108,841 B2
(45) Date of Patent: Aug. 31, 2021

(54) APPARATUS, STORAGE MEDIUM AND METHOD FOR HETEROGENEOUS SEGMENTATION OF VIDEO STREAMING

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Jackson Jarrell Pair, Marina Del Rey, CA (US); Vikash Sharma, Marina Del Rey, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 551 days.

(21) Appl. No.: 16/012,481

(22) Filed: Jun. 19, 2018

(65) Prior Publication Data
US 2019/0387039 A1 Dec. 19, 2019

(51) Int. Cl.
*H04L 29/06* (2006.01)
*H04N 5/232* (2006.01)

(52) U.S. Cl.
CPC ............ *H04L 65/601* (2013.01); *H04L 65/80* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 9,544,601 B2 | 1/2017 | Zhao et al. | |
| 9,729,850 B2 | 8/2017 | Medina et al. | |
| 9,749,622 B2 | 8/2017 | Wiegand et al. | |
| 9,756,330 B2 | 9/2017 | Wiegand et al. | |
| 9,774,850 B2 | 9/2017 | Bosse et al. | |
| 9,918,094 B2 | 3/2018 | Mukherjee | |
| 10,499,066 B2 * | 12/2019 | Copley | H04N 19/162 |
| 2013/0034171 A1 | 2/2013 | Winken et al. | |
| 2016/0165309 A1 | 6/2016 | Van Brandenburg et al. | |
| 2016/0353146 A1 | 12/2016 | Weaver et al. | |
| 2017/0161881 A1 | 6/2017 | Najaf-Zadeh et al. | |
| 2017/0251204 A1 | 8/2017 | Gupte et al. | |

(Continued)

FOREIGN PATENT DOCUMENTS

GB 2524250 A 9/2015

OTHER PUBLICATIONS

The world as you see it with VR180, https://www.blog.google/products/google-vr/world-you-see-it-vr180/, Jun. 22, 2017.

(Continued)

*Primary Examiner* — James M Anderson, II
(74) *Attorney, Agent, or Firm* — Guntin & Gust, PLC; Matthew Tropper

(57) ABSTRACT

Aspects of the subject disclosure may include, for example, obtaining data indicative, for a frame of a video, of a field of view of a user; determining from a set of homogeneous tiles of the frame a subset of the homogeneous tiles that covers the field of view, wherein the set of homogeneous tiles has been constructed prior to the obtaining of the data; and merging at least a first tile of the set of homogeneous tiles and a second tile of the set of homogenous tiles into a larger tile, wherein the merging is based upon at least one parameter. Other embodiments are disclosed.

20 Claims, 17 Drawing Sheets

(56) References Cited

U.S. PATENT DOCUMENTS

| | | |
|---|---|---|
| 2017/0272758 A1 | 9/2017 | Lin et al. |
| 2017/0280126 A1 | 9/2017 | Van Der Auwera et al. |
| 2017/0339415 A1 | 11/2017 | Wang et al. |
| 2017/0339416 A1 | 11/2017 | Hendry et al. |
| 2017/0344843 A1 | 11/2017 | Wang et al. |
| 2017/0347109 A1 | 11/2017 | Hendry et al. |
| 2017/0374375 A1 | 12/2017 | Makar et al. |
| 2018/0040164 A1 | 2/2018 | Newman et al. |
| 2018/0160160 A1* | 6/2018 | Swaminathan .... H04N 21/8456 |
| 2019/0313119 A1 | 10/2019 | Han et al. |

OTHER PUBLICATIONS

De La Fuente, et al., "Video processing for panoramic streaming using HEVC and its scalable extensions", Multimedia Tools and Applications 76.4, 2017, 5631-5659.

Hosseini, Mohammad et al., "Adaptive 360 VR Video Streaming: Divide and Conquer!", Multimedia (ISM), 2016 IEEE International Symposium, IEEE, 2016., 2016, 6 pages.

Ozcinar, Cagri et al., "Viewport-aware adaptive 360 {\deg} video streaming using tiles for virtual reality", arXiv preprint arXiv:1711.02386, https://arxiv.org/pdf/1711.02386, 2017.

Xiao, Mengbai et al., "OpTile: Toward Optimal Tiling in 360-degree Video Streaming", Session: Fast Forward 3; MM'17, Oct. 23-27, Mountain View, CA, USA, 2017.

* cited by examiner

2032

Sending to a server data indicative, for a frame of a streaming video, a field of view of a user of the end user device, wherein the server facilitates determining from a set of homogeneous tiles of the frame of the streaming video a subset of the homogeneous tiles that covers the field of view of the user, wherein each tile of the set of homogeneous tiles has a first area, wherein the set of homogeneous tiles has been constructed for the frame of the streaming video based upon a bandwidth required to transmit some or all of the tiles of the set of homogeneous tiles at a given quality level, wherein the set of homogeneous tiles has been constructed prior to the sending of the data, wherein the server facilitates merging at least a first tile of the set of homogeneous tiles and a second tile of the set of homogenous tiles into a larger tile, wherein the larger tile has a second area that is greater than the first area, and wherein the merging is based upon at least a parameter that is indicative of an estimated network bandwidth required to support the given quality level

2034

Receiving, from the server, a set of heterogeneous tiles including the larger tile and one or more tiles from the subset of tiles that do not overlap the larger tile

2036

Presenting, based upon the set of heterogeneous tiles that is received from the server, an image to the user of the end user device

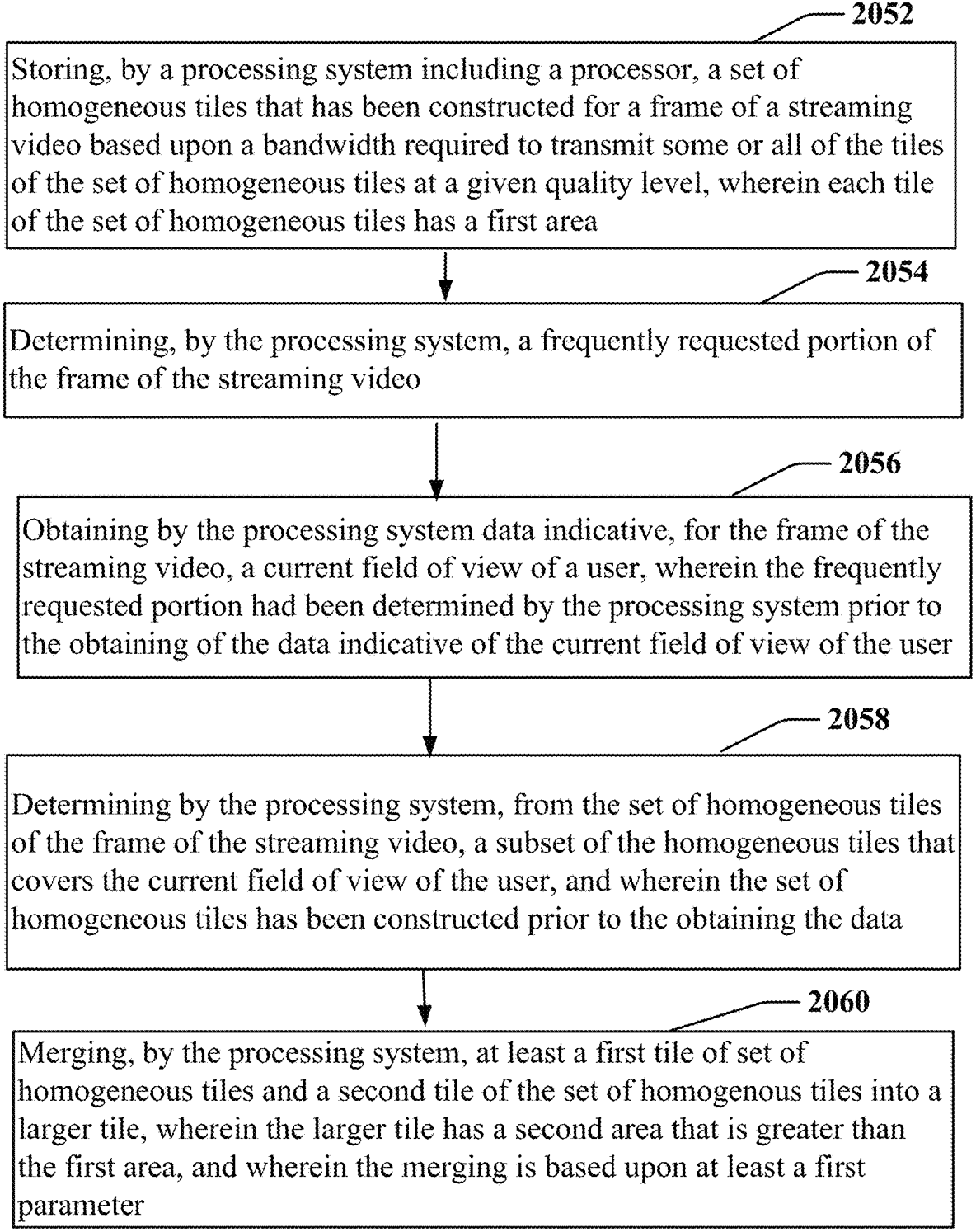

300

APPARATUS, STORAGE MEDIUM AND METHOD FOR HETEROGENEOUS SEGMENTATION OF VIDEO STREAMING

FIELD OF THE DISCLOSURE

The subject disclosure relates to an apparatus, storage medium and method for heterogeneous segmentation of video streaming (e.g., 180 degree video streaming, 360 degree video streaming, panoramic video steaming, immersive video streaming and/or spherical video streaming).

BACKGROUND

The past number of years have seen increasing commercial progress of virtual reality (VR) technology. Users can now experience VR capabilities on mobile devices (for example, using VR devices such as GOOGLE CARDBOARD and SAMSUNG GEAR VR). 360 degree videos, also known sometimes as immersive or spherical videos, play an important role in the VR ecosystem. Such 360 degree videos provide users with panoramic views and create a unique viewing experience (particularly when used, for example, in combination with 3D video technology). Conventional 360 degree videos are typically recorded by omnidirectional cameras or camera array systems (e.g., FACEBOOK SURROUND 360). Such mechanisms typically operate by simultaneously recording all 360 degrees of a scene that can then be "wrapped" onto a 3D sphere using various projection schemes (e.g., with the camera(s) at the center).

Typically, when watching a 360 degree video, a viewer is supposed to be at the spherical center and can freely control his or her viewing directions. Therefore, each playback creates a unique user experience. The 360 degree video player typically computes and displays the viewing area based on the orientation and the visible Field of View (FoV) of the user. The FoV defines the extent of the observable area, which is typically a fixed parameter of a VR headset (e.g., 110° horizontally and 90° vertically).

Fetching the entire raw video frame, which is sometimes the practice of certain conventional 360 degree video players, wastes bandwidth and makes the delivery of high-resolution 360 degree videos difficult, if not impossible. Thus, certain conventional approaches segment 360 degree videos into tiles, which can potentially save delivery bandwidth by sending only tiles overlapping with the FoV of a user.

In addition, video players of mobile devices typically leverage hardware-based decoders (e.g., multimedia chipset, GPU, etc.) for better efficiency and smoother playback. As a result, for tile-based 360 degree video streaming, a video player may need to use multiple hardware decoders simultaneously for a number of delivered tiles. However, modern mobile devices have a limited number of hardware decoders (typically around 10), restricting the amount of tiles that can be decoded at the same time.

BRIEF DESCRIPTION OF THE DRAWINGS

Reference will now be made to the accompanying drawings, which are not necessarily drawn to scale, and wherein:

FIG. 2K depicts an illustrative embodiment of a method in accordance with various aspects described herein.

FIG. 2L depicts an illustrative embodiment of a method in accordance with various aspects described herein.

DETAILED DESCRIPTION

The subject disclosure describes, among other things, illustrative embodiments for heterogeneous segmentation of video streaming (e.g., 180 degree video streaming, 360 degree video streaming, panoramic video steaming, immersive video streaming and/or spherical video streaming). Other embodiments are described in the subject disclosure.

One or more aspects of the subject disclosure include mechanisms for heterogeneous segmentation that starts from pre-constructed homogeneous segments (e.g., optimal fine-grained homogeneous segments) and then merges the tiles overlapping with the FoV into larger ones.

One or more aspects of the subject disclosure include mechanisms for reducing the number of tiles that are delivered to an end user device based on the most-frequently-visited FoVs (e.g., the most-frequently-visited FoVs as identified by video content analytics).

Figure 1:
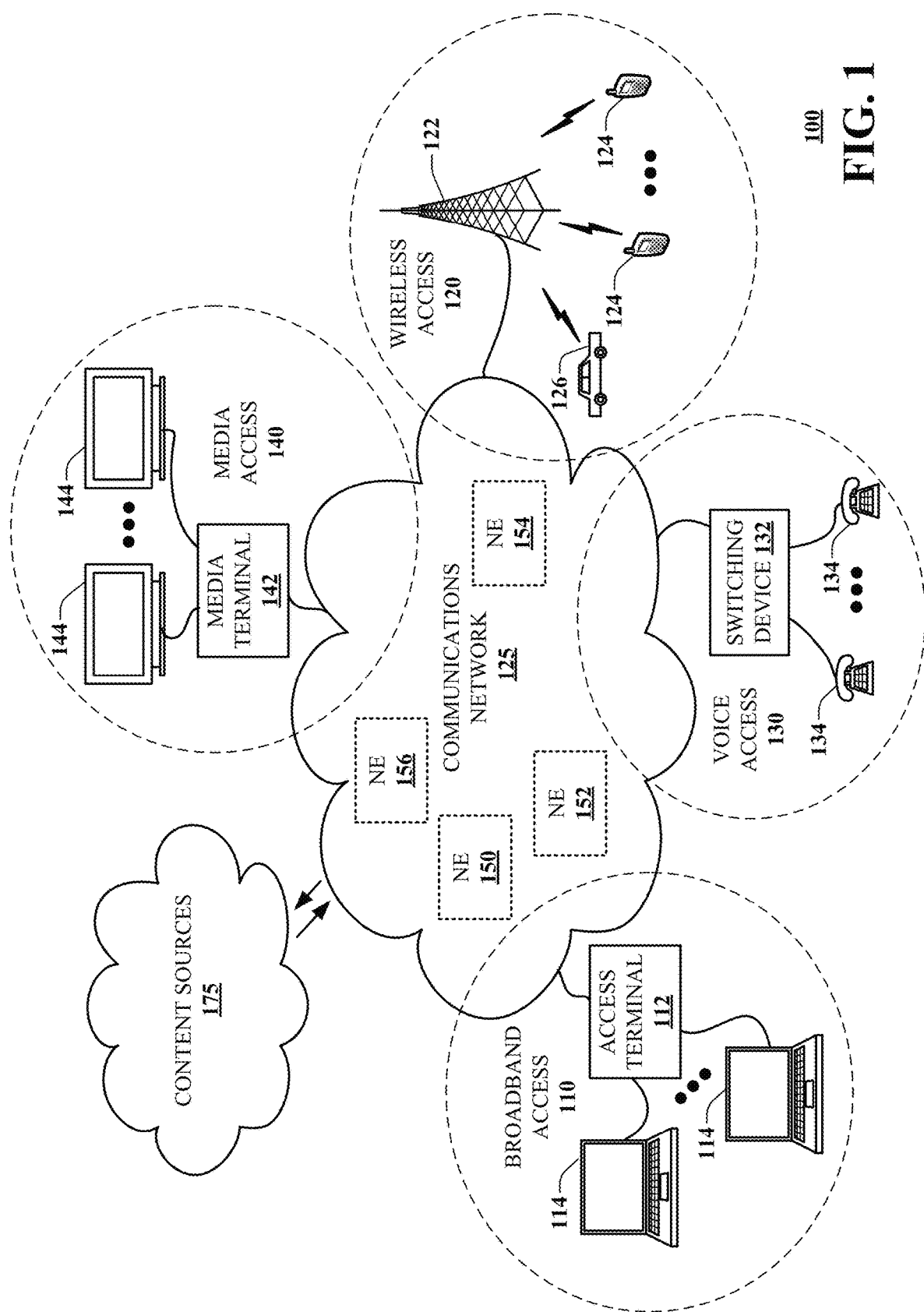
FIG. 1 is a block diagram illustrating an example, non-limiting embodiment of a system in accordance with various aspects described herein.

Referring now to FIG. 1, a block diagram is shown illustrating an example, non-limiting embodiment of a system 100 in accordance with various aspects described herein. For example, system 100 can facilitate in whole or in part video streaming that utilizes heterogeneous segmentation (the video streaming can be, e.g., 180 degree video streaming and/or 360 degree video streaming). In particular, a system 100 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
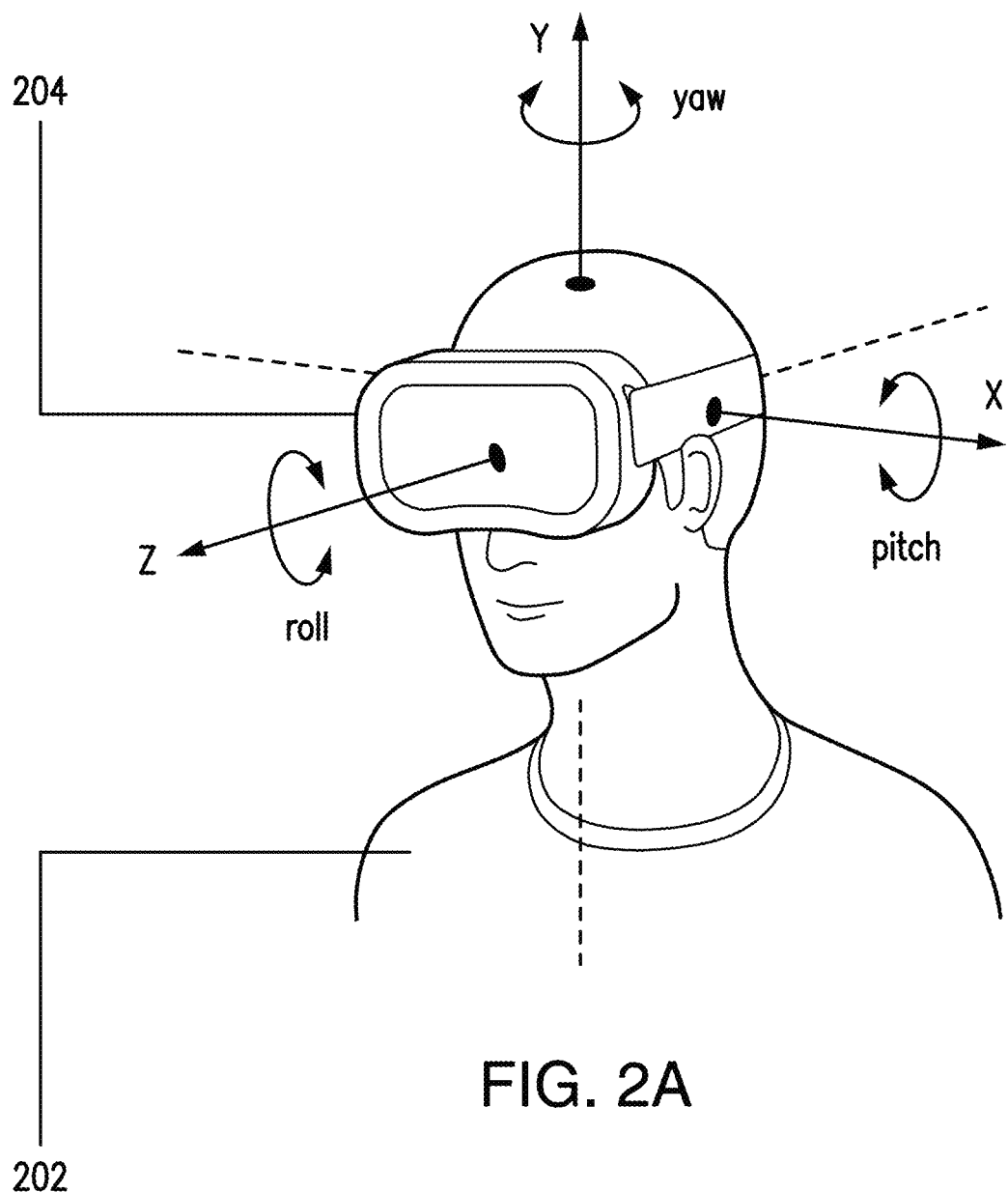
FIG. 2A is a diagram illustrating an example, non-limiting embodiment of a VR headset (that facilitates adjusting 360 degree video viewing directions) functioning within the system of FIG. 1 and/or within the system of FIG. 2C in accordance with various aspects described herein.
Figure 2B:
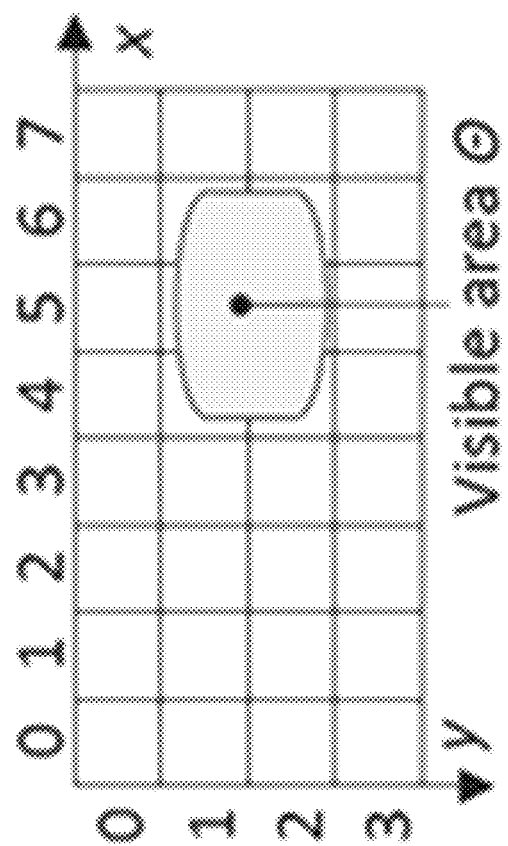
FIG. 2B depicts an example, non-limiting embodiment of a tiling scheme in accordance with various aspects described herein.
Figure 2C:
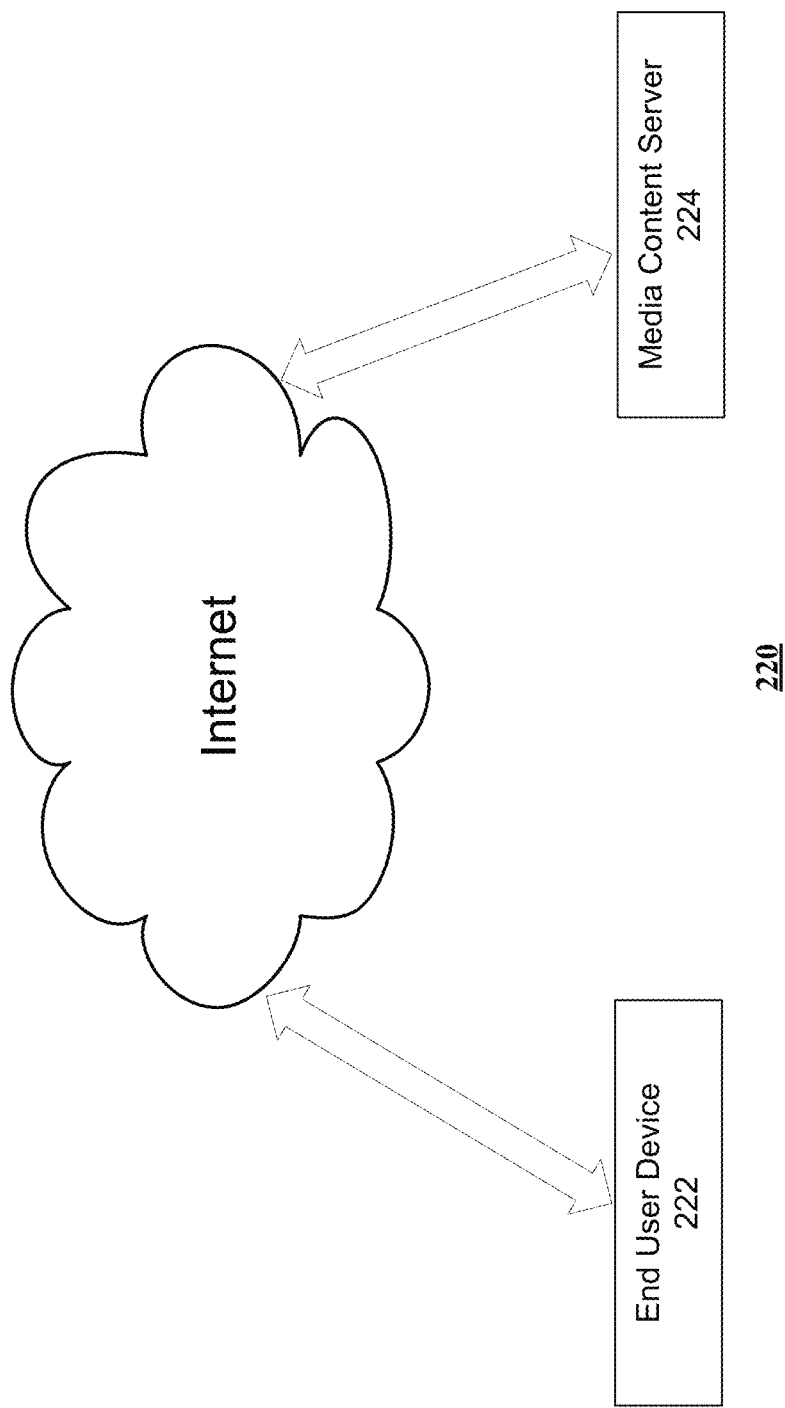
FIG. 2C is a block diagram illustrating an example, non-limiting embodiment of a system functioning within the system of FIG. 1 (and/or independent of the system of FIG. 1) in accordance with various aspects described herein.

Referring now to FIG. 2A, this shows a diagram illustrating an example, non-limiting embodiment of a VR headset (that facilitates adjusting 360 degree video viewing directions) functioning within the system of FIG. 1 and/or within the system of FIG. 2C in accordance with various aspects described herein.

As seen in FIG. 2A, when watching a 360 degree video, a viewer 202 is supposed to be at the spherical center and can freely control her or his viewing directions. Therefore, each playback creates a unique user experience. The viewer 202 wearing a VR headset 204 can adjust her or his orientation by changing the pitch, yaw, and roll, which correspond to rotating along the X, Y, and Z axes, respectively. The 360 degree video player (e.g., of the VR headset 204) computes and displays the viewing area based on the orientation and the Field of View (FoV). The FoV defines the extent of the observable area, which is usually a fixed parameter of a VR headset (e.g., 110° horizontally and 90° vertically).

For traditional videos, to enable simultaneous download and playback, a video is temporally segmented into chunks or byte ranges. To support downloading a subarea of a video chunk, the video also needs to be spatially segmented. This can be realized in an online manner: the client device computes the target area of a chunk, and embeds the computed target area into HTTP request parameters; the server then dynamically generates a smaller chunk containing only the target area and transmits it to the client. This approach typically increases the server-side computational overhead.

Various embodiments leverage a spatial segmentation of 360 degree video in an offline manner. Each 360 degree video chunk 210 (see FIG. 2B, showing an example homogeneous segmentation) is pre-segmented into multiple smaller chunks, which are called tiles. A tile has the same duration as a chunk while only covering a subarea of the chunk. An easy way to generate the tiles is to evenly divide a chunk containing projected raw frames into m×n rectangles each corresponding to a tile. Suppose the projected visible area is $\Theta$ (see FIG. 2B). The client only requests for the tiles that overlap with $\Theta$. As seen in the example of FIG. 2B, m=4 and n=8, and $\Theta$ is the shaded oblong region. The client will only request for the six tiles ($1 \leq y \leq 2$, $4 \leq x \leq 6$,) overlapping with $\Theta$. Note that due to projection, despite the viewer's FoV being fixed, the size of $\Theta$ and thus the number of requested tiles may vary. For example, under the equirectangular projection, more tiles are needed when the viewer looks upward and downward compared to when he or she looks straight forward. Performing the spatial segmentation offline eliminates the server-side overhead. Multiple tiles can be requested (and included) in a single bundle to reduce network roundtrips. Tiles' metadata such as positions and URLs can be embedded in a metafile exchanged at the beginning of a video session. Note that, at a high level, this spatial segmentation is similar to the tiling feature in High Efficiency Video Coding (HEVC, a.k.a. H.265 and MPEG-H Part 2).

Figure 2D:
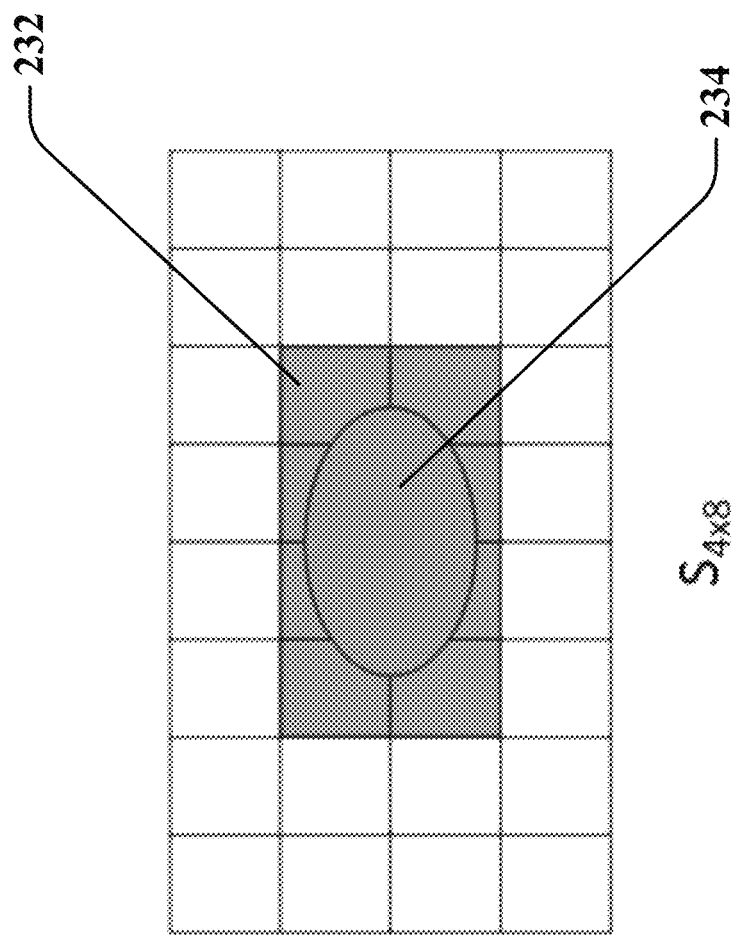
FIG. 2D depicts an example, non-limiting embodiment of a tiling scheme in accordance with various aspects described herein.
Figure 2E:
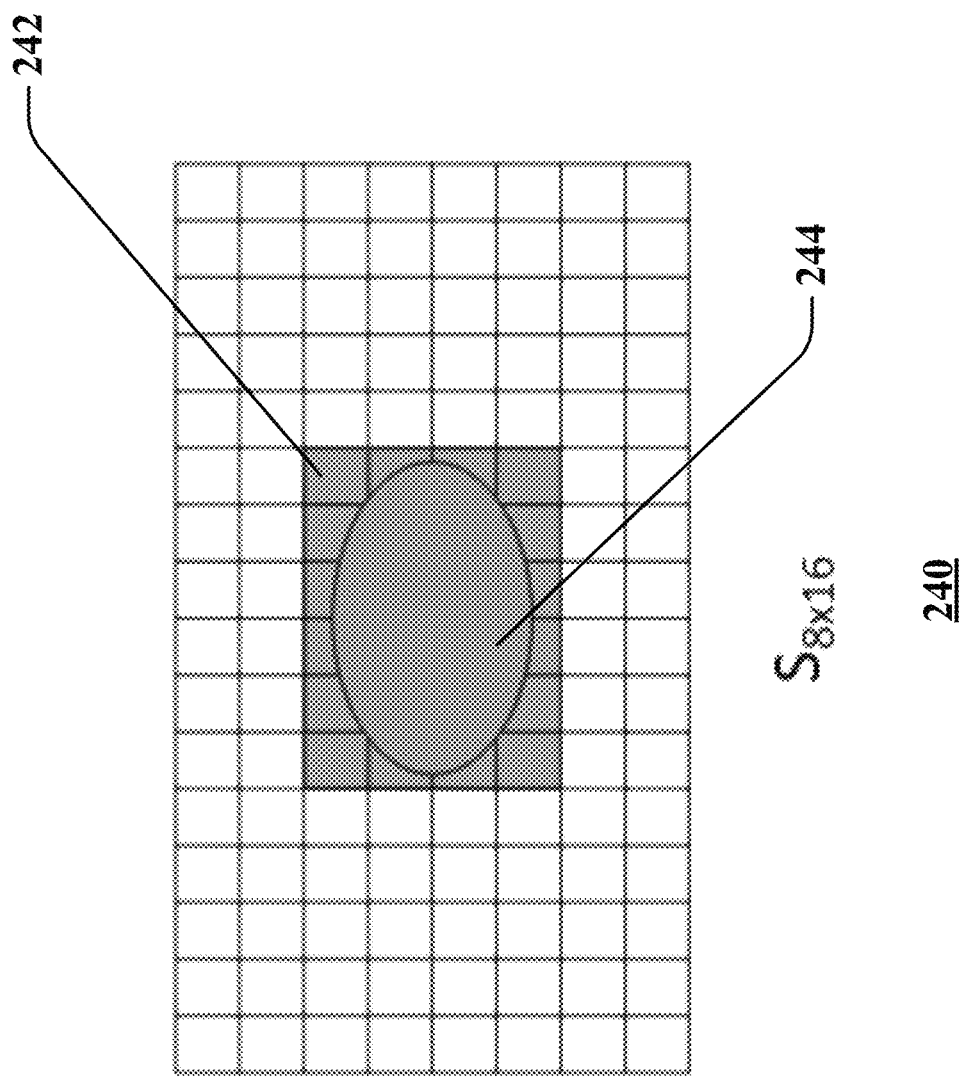
FIG. 2E depicts an example, non-limiting embodiment of a tiling scheme in accordance with various aspects described herein.

Although tile-based video delivery has been proposed in the HEVC standard, it is conventionally unclear with respect to the standard as to what the best solution is for dividing a video into tiles, especially for 360 degree videos. As mentioned above, a simple solution would be to segment 360 degree videos uniformly. Two example homogeneous segmentation schemes for tile-based 360 degree video streaming are shown in FIGS. 2D and 2E (showing, respectively, homogeneous 4×8 tiles and homogeneous 8×16 tiles). The shaded oval areas in these FIGS. 2D and 2E (see call-out number 234 and call-out number 244) are the field of views of a given video frame whose actual shape depends on the projection method used by a 360 degree video. The shaded tiles (see generally call-out number 232 and call-out number 242) that overlap with the respective FoV will be delivered to the viewers for this video frame. As can be seen in these FIGS. 2D and 2E, when using a tile-based approach for 360 degree video streaming, 8 and 24 tiles need to be decoded, respectively, for 4×8 and 8×16 segmentations. In general, smaller tiles may lead to better bandwidth saving, as the delivered portion of a video frame for a given FoV will be smaller than using larger ones. However, the video encoding efficiency of small tiles may not be as good as large ones (for example, larger tiles may make use of redundant information). Thus, there is an optimal segmentation scheme for tile-based 360 degree video streaming when using homogeneous segmentation.

FIG. 2C is a block diagram illustrating an example, non-limiting embodiment of a system 220 functioning within the system of FIG. 1 (and/or independent of the system of FIG. 1) in accordance with various aspects described herein. As seen in FIG. 2C, end user device 222 is in bi-directional communication with media content server 224 (end user device can operate, for example, as a client device). In various examples, end user device 222 can comprise a mobile device such as a mobile phone, a smartphone, or the like. In other examples, the end user device 222 can comprise a virtual reality (VR) device, an augmented reality (AR) device, or the like. In other examples, the end user device 222 can comprise headgear such as glasses, goggles, or the like. In one specific example, the headgear can be in indirect bi-directional communication with the media content server 224 via a separate mobile device. In another specific example, the headgear can be in direct bi-directional communication with the media content server 224. In another specific example, the end user device 222 can be in bi-directional communication with the media content server 224 via the Internet.

In operation, the media content server 224 can provide video to the end user device 222. In one specific example, the video can be streaming video. In another specific example, the streaming video can be 360 degree streaming video. In another specific example, the streaming video can be 180 degree streaming video. The video can be provided to the end user device 222 by the media content server 224 in response to one or more requests from the end user device 222. In one specific example, the request(s) may be sent by the end user device 222 to the media content server 224 in an HTTP format (e.g., as data in an HTTP communication). In one specific example, the request(s) may provide to the media content server 224 a current field of view of a user of the end user device.

Figure 2F:
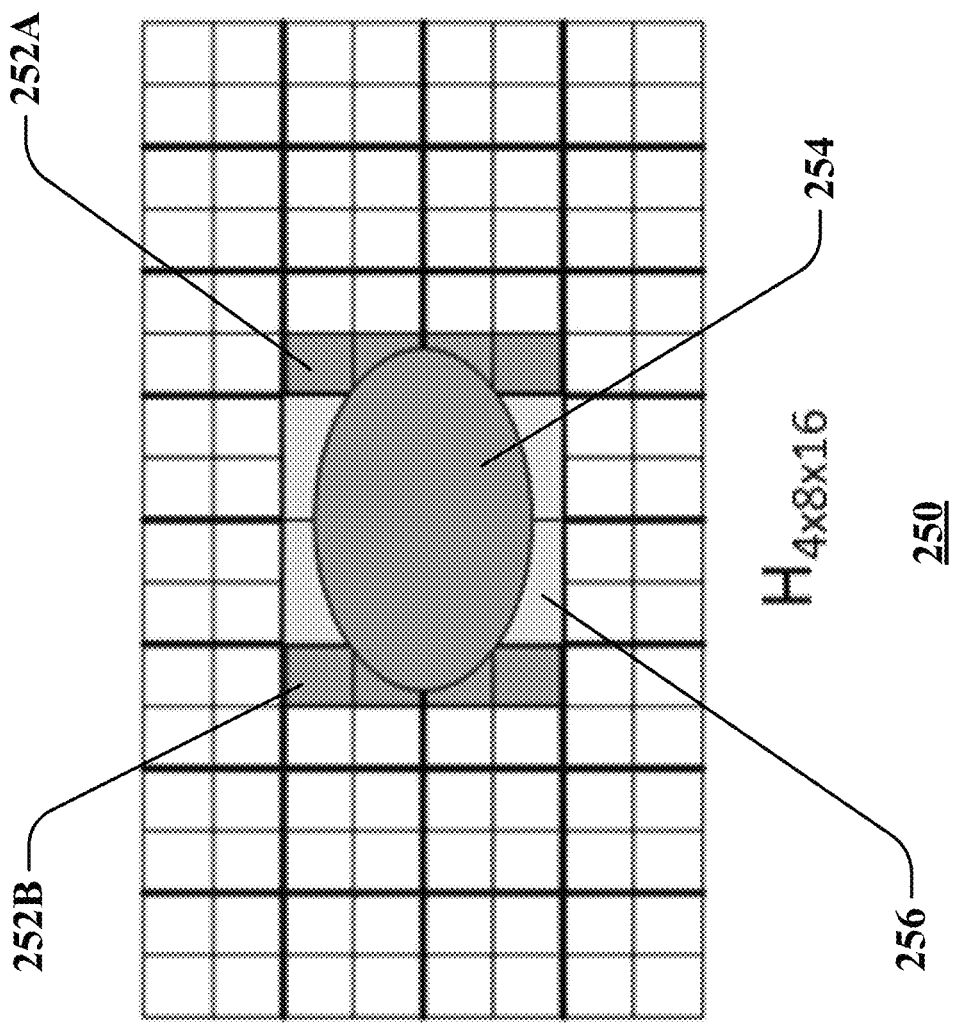
FIG. 2F depicts an example, non-limiting embodiment of a tiling scheme in accordance with various aspects described herein.

As described herein, one embodiment provides a heterogeneous segmentation mechanism (e.g., 180 degree video streaming, 360 degree video streaming, panoramic video steaming, immersive video streaming and/or spherical video streaming) that starts from the optimal homogeneous segmentation (e.g., 8×16 tiles). In this example, the initial delivered tile-set C has 24 tiles (see call-out 242 of FIG. 2E showing generally the 24 shaded tiles), which overlap with the FoV (see call-out 244 of FIG. 2E showing the shaded oval). The segmentation mechanism then replaces as many as possible segments in C with one-level higher segmentation using, in this example, 4×8 tiles. As can be seen in the heterogeneous $H_{4\times8\times16}$ scheme 250 in FIG. 2F, only twelve segments need to be delivered to the end user device—four 4×8 segments (see the four central lighter-shaded tiles identified generally at call-out 256) and eight 8×16 segments (see the four right vertically oriented darker-shaded tiles identified generally at call-out 252A and the four left vertically oriented darker-shaded tiles identified generally at call-out 252B). Of note, these twelve segments are delivered to the end user device instead of twenty-four 8×16 segments.

Figure 2G:
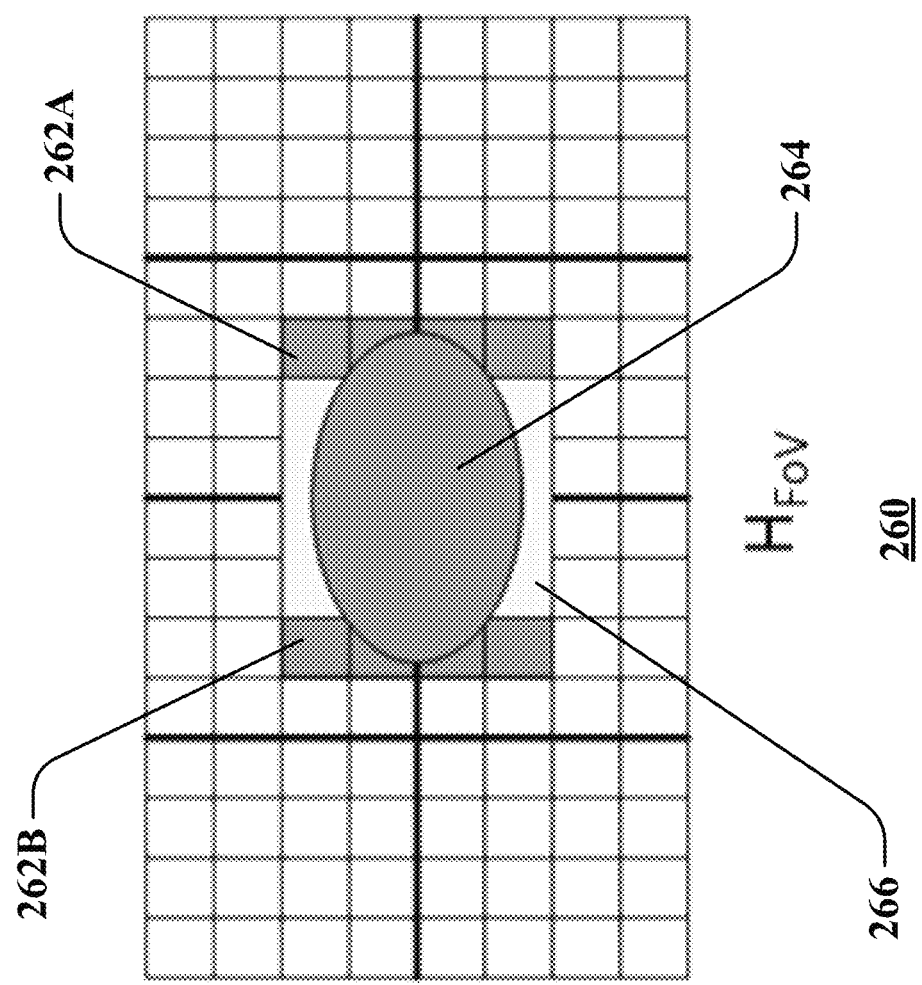
FIG. 2G depicts an example, non-limiting embodiment of a tiling scheme in accordance with various aspects described herein.

As described herein, another embodiment is based on the embodiment described immediately above, and goes a step further by merging the four 4×8 tiles and generating one 2×4 tile. Therefore, the heterogeneous $H_{FoV}$ scheme 260 (as shown in FIG. 2G) delivers to the end user device only nine tiles—one 2×4 tile (see the single central lighter-shaded tile identified at call-out 266) and eight 8×16 tiles (see the four right vertically oriented darker-shaded tiles identified generally at call-out 262A and the four left vertically oriented darker-shaded tiles identified generally at call-out 262B). However, this merged 2×4 tile (see call-out number 266) does not belong to the original eight tiles of the 2×4 segmentation, which are shown in the $H_{FoV}$ scheme 260 of FIG. 2G. As a result, the video streaming service provider may need to create these ad-hoc tiles in advance and save them together with the tiles from homogeneous segmentations. This saving of such ad-hoc tiles in advance may increase the storage overhead on the server side. To help solve this problem, an embodiment provides for generation of the additional ad-hoc tiles (e.g., 2×4 tiles) for only most-frequently-visited FoVs (e.g., instead of ad-hoc tiles for the entire 360 degree video frame).

In this regard, the most-frequently-visited FoVs can be created, for example, by leveraging statistics from crowdsourced viewing data. Popular 360 degree videos from commercial content providers and video-sharing websites attract a large number of viewers. Also, it is known that users' viewing behaviors are often affected by the video content. Based on the above observation, crowdsourced viewing statistics can be utilized by, for example, instrumenting the 360 degree video players to record the frequency of a given FoV (such data can be collected, for example, by video servers). In one specific example, a tile's download frequency can be defined as the number of video sessions that fetch this tile divided by the total number of sessions accessing video of which the tile is a part. With the crowdsourced data, a heat map can be generated showing the most-frequently-viewed content (e.g., tile portions) in a 360 degree video. 360 degree video streaming service providers can then use the heat map to generate the additional ad-hoc segments for the most-frequently-visited FoVs. This can help to reduce the real-time load on the server since these tiles can be generated ahead of time and stored for future use.

Figure 2H:
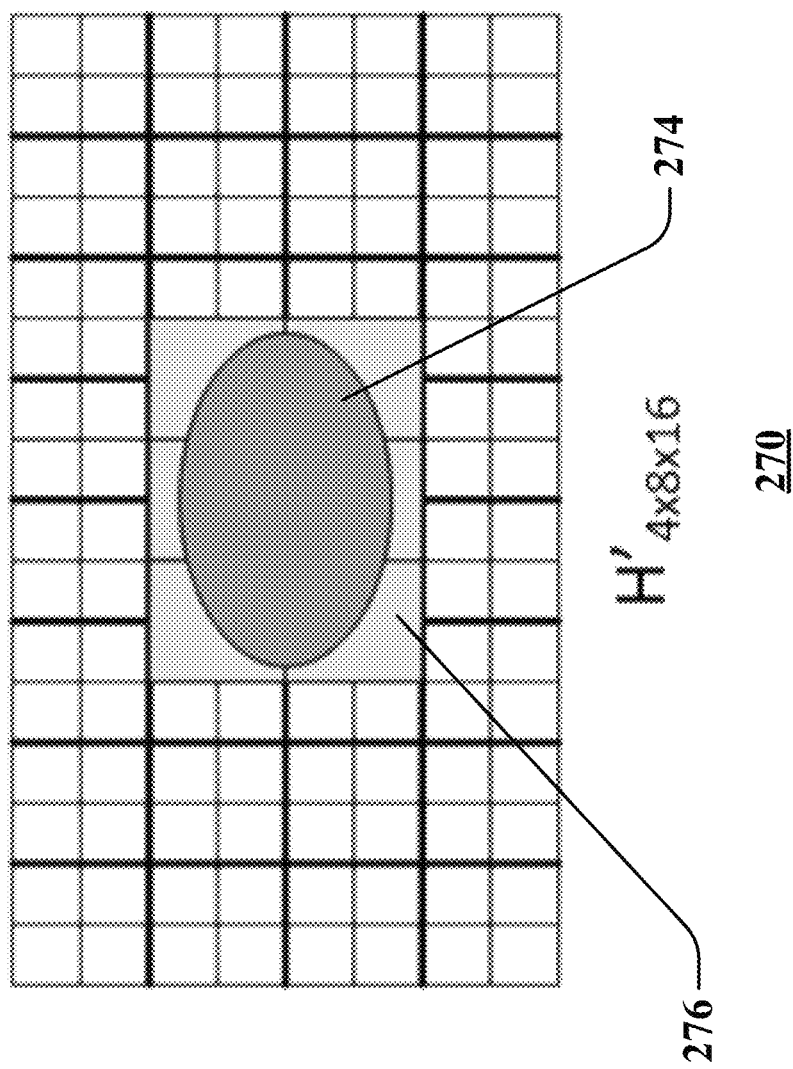
FIG. 2H depicts an example, non-limiting embodiment of a tiling scheme in accordance with various aspects described herein.
Figure 2I:
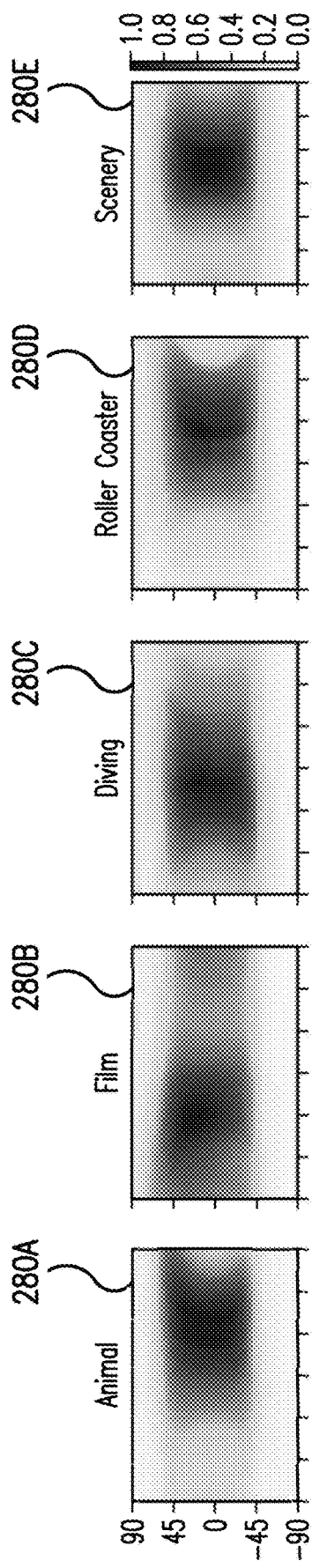
FIG. 2I depicts various example, non-limiting embodiments of "heat maps" in accordance with various aspects described herein.
Figure 2I:
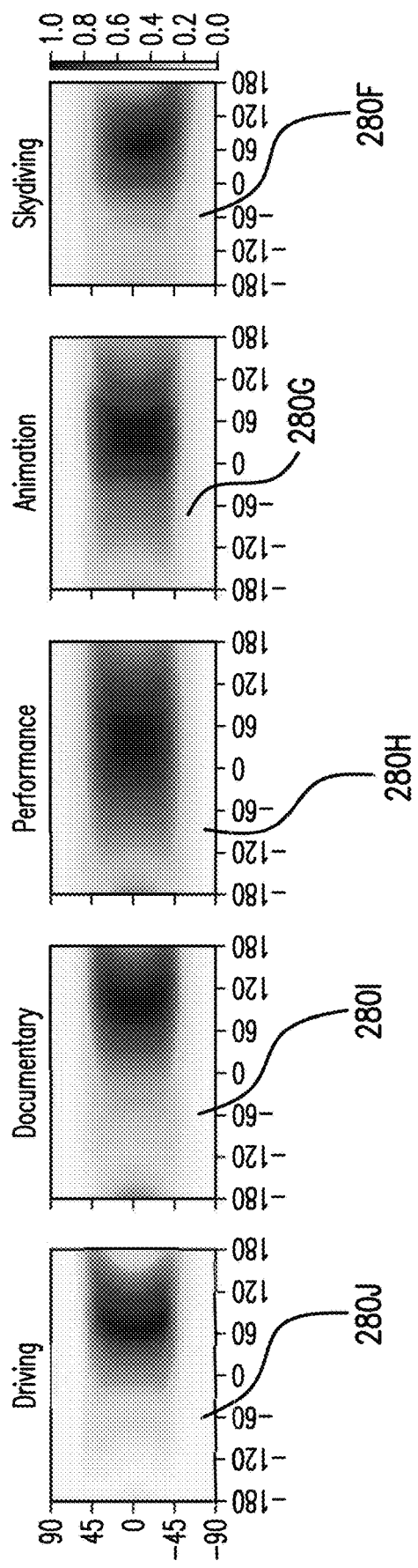

Referring now to FIG. 2I, shown are heat maps 280A-280J of viewing density based on the content access patterns from a large-scale user study conducted for ten popular 4K 360 degree videos from YOUTUBE with at least 2 million views. As can be seen from this FIG. 2I, there are certain areas with a very high viewing density (i.e., the "hot" areas that are shown in darker shades) for almost all videos. Once these "hot" areas are known, the ad-hoc tiles can be created mainly for these "hot" areas.

As described herein, another embodiment can extend the above $H_{4 \times 8 \times 16}$ scheme by merging the original twenty-four 8×16 tiles into six 4×8 tiles. Again, the issue here is that these six 4×8 tiles are not in the original thirty-two 4×8 tiles shown in heterogeneous $H'_{4 \times 8 \times}16$ scheme 270 of FIG. 2H. In this regard, the approach discussed above can be used to create the additional ad-hoc 4×8 tiles for most-frequently-visited FoVs. Compared to HEW, $H'_{4 \times 8 \times 16}$ can further reduce the number of tiles delivered to the end user device from 9 to 6.

There are multiple metrics that can be employed to determine which heterogeneous segment scheme to use. One of the metrics is the amount of transferred data, which depends on the video content. Suppose, for example, that for video A the size of each 4×8 tile is 1 MB. Thus, transfer of 6 MB data would be needed for $H'_{4 \times 8 \times 16}$. Suppose also that the size of a 2×4 tile is 3.8 MB and the size of an 8×16 tile is 0.3 MB. As a result, transfer of 3.8+8*0.3=6.2 MB data would be needed for $H_{FoV}$. Based on the amount of transferred data, $H'4 \times 8 \times 16$ would be preferred for video A. For another video B, suppose that the size of each 4×8 tile is still 1 MB. But further suppose that the size of a 2×4 tile is 3.7 MB and the size of an 8×16 tile is 0.27 MB. In this case, transfer of 6 MB data would be needed for $H'_{4 \times 8 \times 16}$ but 3.7+8*0.27=5.86 MB data would be needed for $H_{FoV}$. Based on the amount of transferred data, $H_{FoV}$ would be preferred for video B.

As described herein, hardware accelerated video decoding is typically known to be faster than a software based approach (software video decoding typically leverages a standard CPU on mobile devices to decode video frames, which is usually considered inferior as video processing is computation-intensive and may take many CPU cycles). When using software decoding, mobile devices often have trouble playing high-definition videos. For instance, when streaming a 1080p H.264 video from YOUTUBE on mobile devices, the playback may be sometimes laggy. To solve this problem, manufacturers typically install multimedia chipsets to accelerate the video decoding process. However, the number of hardware decoders available on mobile devices is commonly limited. As can be seen from Table 1, below, it is believed that there are only 13 hardware decoders available on a GOOGLE NEXUS 5X smartphone with both ANDROID 7.0 and 7.1.1 operating systems, which demonstrates the number of available hardware decoders seems not to depend on the operating system. Further, it is believed that there are 16 hardware decoders for SAMSUNG GALAXY S7 and S7 EDGE smartphones with ANDROID 6.0.1 operating system. Thus, it is challenging for mobile devices to decode a large number of tiles when required and to guarantee the quality of user experience. Various embodiments described herein address this issue of limited hardware decoder resources.

TABLE 1

The numbers of hardware decoders for GOOGLE NEXUS 5X and SAMSUNG GALAXY S7/S7 EDGE

| Phone | Android Version | Max. # of Decoders |
|---|---|---|
| Google Nexus 5X | 7.0 | 13 |
| Google Nexus 5X | 7.1.1 | 13 |

TABLE 1-continued

The numbers of hardware decoders for GOOGLE NEXUS 5X and SAMSUNG GALAXY S7/S7 EDGE

| Phone | Android Version | Max. # of Decoders |
|---|---|---|
| Samsung Galaxy S7 Edge | 6.0.1 | 16 |
| Samsung Galaxy S7 | 6.0.1 | 16 |

In this regard, as described herein, there are several benefits to the heterogeneous segmentation for tile-based video streaming (e.g., 180 degree video streaming, 360 degree video streaming, panoramic video steaming, immersive video streaming and/or spherical video streaming). First, heterogeneous segmentation can reduce the number of required hardware decoders (such as by reducing the number of tiles delivered to the end user device) and make tile-based video streaming (e.g., 180 degree video streaming, 360 degree video streaming, panoramic video steaming, immersive video streaming and/or spherical video streaming) feasible (and/or more enjoyable) on mobile devices. In addition, heterogeneous segmentation can reduce the energy consumption of mobile devices by using fewer number of hardware decoders (and thus can improve the battery life). Moreover, since a larger tile typically has better encoding efficiency than smaller tiles, by merging the tiles of the optimal homogeneous segmentation into larger tiles, mobile data usage can be reduced (thus, for example, alleviating congestions on cellular networks).

Figure 2J:
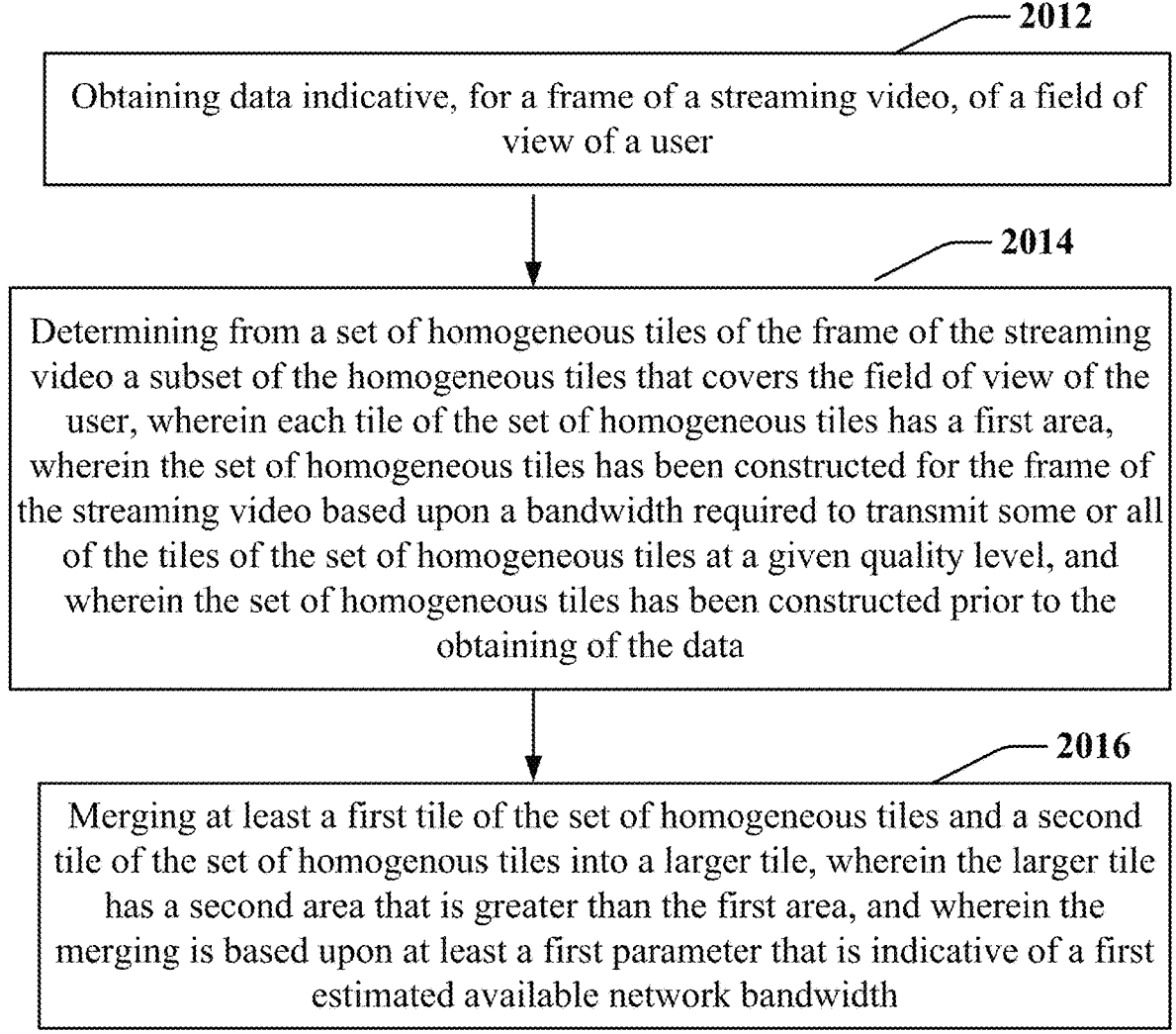
FIG. 2J depicts an illustrative embodiment of a method in accordance with various aspects described herein.

FIG. 2J depicts an illustrative embodiment of a method 2010 in accordance with various aspects described herein. As seen in this FIG. 2J, step 2012 comprises obtaining data indicative, for a frame of a streaming video, of a field of view of a user. Next, step 2014 comprises determining from a set of homogeneous tiles of the frame of the streaming video a subset of the homogeneous tiles that covers the field of view of the user, wherein each tile of the set of homogeneous tiles has a first area, wherein the set of homogeneous tiles has been constructed for the frame of the streaming video based upon a bandwidth required to transmit some or all of the tiles of the set of homogeneous tiles at a given (e.g., first) quality level, and wherein the set of homogeneous tiles has been constructed prior to the obtaining of the data. Next, step 2016 comprises merging at least a first tile of the set of homogeneous tiles and a second tile of the set of homogenous tiles into a larger tile, wherein the larger tile has a second area that is greater than the first area, and wherein the merging is based upon at least a first parameter that is indicative of a first estimated network bandwidth required to support the given (e.g., first) quality level.

In one example: the merging the first tile and the second tile into the larger tile comprises merging the first tile, the second tile, a third tile of the set of homogeneous tiles and a fourth tile of the set of homogeneous tiles into the larger tile; each of the first tile, the second tile, the third tile and the fourth tile are adjacent to one another; and the merging the first tile, the second tile, the third tile and the fourth tile into the larger tile comprises merging only a portion of at least one of the first tile, the second tile, the third tile and the fourth tile into the larger tile.

In another example, the merging the first tile, the second tile, the third tile and the fourth tile into the larger tile comprises merging only a first portion of the first tile, only a second portion of the second tile, only a third portion of the third tile and only a fourth portion of the fourth tile into the larger tile.

In another example, the set of homogeneous tiles has been optimally constructed for the frame of the streaming video based upon the tiles of the set of homogeneous tiles that are within a then-current field of view.

In another example, the merging the first tile and the second tile comprises merging two horizontally adjacent tiles from the set of homogeneous tiles.

In another example, the merging the first tile and the second tile comprises merging two vertically adjacent tiles from the set of homogeneous tiles.

In another example, the streaming video is a 360 degree streaming video, a 180 degree streaming video, or any combination thereof.

In another example, the device is a server and wherein the data is obtained from an end user video presentation device.

In another example, the data comprises an identification of a plurality of tiles, of the set of homogenous tiles, that cover the field of view of the user.

In another example, the method further comprises providing to the end user video presentation device a set of heterogeneous tiles including the larger tile and one or more tiles from the subset of the homogeneous tiles that do not overlap the larger tile.

In another example, the set of heterogeneous tiles covers the field of view of the user.

In another example, the set of heterogeneous tiles is provided to the end user video presentation device responsive to the data being obtained from the end user video presentation device.

In another example, the set of homogeneous tiles has been constructed based upon an estimated available network bandwidth.

In another example, the data is obtained from an end user video presentation device; and the second parameter comprises a minimization of an amount of tile data to be sent to the end user video presentation device in order to cover the field of view of the user.

In another example, the device is a server, and the method further comprises providing to an end user video presentation device a set of heterogeneous tiles including the larger tile and one or more tiles from the subset of the homogeneous tiles that do not overlap the larger tile; obtaining other data indicative, for another frame of the streaming video, of another field of view of the user, wherein the other data is obtained from the end user video presentation device; determining from another set of homogeneous tiles of the another frame of the streaming video another subset of the homogeneous tiles that covers the another field of view of the user; merging at least a third tile of the another set of homogeneous tiles and a fourth tile of the another set of homogenous tiles into another larger tile, wherein the merging is based upon at least a second parameter that is indicative of a second estimated network bandwidth required to support another given (e.g., second) quality level, and wherein the second estimated network bandwidth required to support the another given (e.g., second) quality level is different from the first estimated network bandwidth required to support the given (e.g., first) quality level; and providing to the end user video presentation device another set of heterogeneous tiles including the another larger tile and one or more tiles from the another subset of the homogeneous tiles that do not overlap the larger tile.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2K depicts an illustrative embodiment of a method 2030 in accordance with various aspects described herein. As seen in this FIG. 2K, step 2032 comprises sending to a server data indicative, for a frame of a streaming video, a field of view of a user of the end user device, wherein the server facilitates determining from a set of homogeneous tiles of the frame of the streaming video a subset of the homogeneous tiles that covers the field of view of the user, wherein each tile of the set of homogeneous tiles has a first area, wherein the set of homogeneous tiles has been constructed for the frame of the streaming video based upon a bandwidth required to transmit some or all of the tiles of the set of homogeneous tiles at a given quality level, wherein the set of homogeneous tiles has been constructed prior to the sending of the data, wherein the server facilitates merging at least a first tile of the set of homogeneous tiles and a second tile of the set of homogenous tiles into a larger tile, wherein the larger tile has a second area that is greater than the first area, and wherein the merging is based upon at least a parameter that is indicative of an estimated network bandwidth required to support the given quality level. Next, step 2034 comprises receiving, from the server, a set of heterogeneous tiles including the larger tile and one or more tiles from the subset of tiles that do not overlap the larger tile. Next, step 2036 comprises presenting, based upon the set of heterogeneous tiles that is received from the server, an image to the user of the end user device.

In one example, the end user device comprises headgear that presents the image to the user; the streaming video is a 360 degree streaming video, a 180 degree streaming video, or any combination thereof; and the sending of the data to the server causes the server to send the set of heterogeneous tiles to the end user device.

In another example, the headgear comprises one of: goggles; glasses, virtual reality headgear, augmented reality headgear, or any combination thereof.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2L depicts an illustrative embodiment of a method 2050 in accordance with various aspects described herein. As seen in this FIG. 2L, step 2052 comprises storing, by a processing system including a processor, a set of homogeneous tiles that has been constructed for a frame of a streaming video based upon a bandwidth required to transmit some or all of the tiles of the set of homogeneous tiles at a given quality level, wherein each tile of the set of homogeneous tiles has a first area. Next, step 2054 comprises determining, by the processing system, a frequently requested portion of the frame of the streaming video. Next, step 2056 comprises obtaining by the processing system data indicative, for the frame of the streaming video, a current field of view of a user, wherein the frequently requested portion had been determined by the processing system prior to the obtaining of the data indicative of the current field of view of the user. Next, step 2058 comprises determining by the processing system, from the set of homogeneous tiles of the frame of the streaming video, a subset of the homogeneous tiles that covers the current field of view of the user, and wherein the set of homogeneous tiles has been constructed prior to the obtaining the data. Next, step 2060 comprises merging, by the processing system, at least a first tile of the set of homogeneous tiles and a second tile of the set of homogenous tiles into a larger tile, wherein the larger tile has a second area that is greater than the first area, and wherein the merging is based upon at least a first parameter.

In one example, the data is obtained from an end user video presentation device, wherein the first parameter comprises a minimization of an amount of tile data to be sent to the end user video presentation device in order to cover the current field of view of the user, wherein the merging comprises forming the larger tile based upon some or all pixels of the first tile and some or all pixels of the second tile, and wherein the method further comprises providing to the end user video presentation device a set of heterogeneous tiles including the larger tile and one or more tiles from the subset of tiles that do not overlap the larger tile.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide heterogeneous segmentations that can significantly reduce the number of tiles delivered to an end user device for a given FoV.

As described herein, various embodiments provide a heterogeneous segmentation that starts from the optimal fine-grained segmentation and then merges as many tiles as possible overlapping with the FoV into larger tiles. As described herein, various embodiments provide an enhanced scheme that can further reduce the number of tiles delivered to the end user device based on the most-frequently-visited FoVs identified by video content analytics.

As described herein, various embodiments can be used in the context of a cellular service provider, or the like. As described herein, various embodiments can be used in the context of a video content provider, or the like.

As described herein, one or more additional tiles (in addition to the minimum required number of tiles) can be delivered to the end user device (e.g., for robustness).

As described herein, use of heterogeneous tiles (that is, tiles of differing sizes) can facilitate reaching certain goals (e.g., bandwidth goals, storage goals).

As described herein, use of heterogeneous tiles can decrease resource inefficiency on cellular networks with limited bandwidth (and/or metered link), decrease fluctuating throughput, and/or decrease device radio energy consumption.

In another example, an audio content associated with the video streaming can be ambisonic (360 degree).

Various techniques for determining certain homogeneous segments, such as the optimal fine-grained segments, can be utilized. In one example, optimal fine-grained homogeneous segments can be determined based upon reducing (or minimizing) a number of bytes that need to be stored for a given media content. In one specific example, the reduced (or minimized) number of bytes that need to be stored for the given media content can be based upon raw media content. In another specific example, the reduced (or minimized) number of bytes that need to be stored for the given media content can be based upon encoded media content. In another specific example, the reduced (or minimized) number of bytes that need to be stored for the given media content can be based upon compressed media content. In another specific example, the reduced (or minimized) number of bytes that need to be stored for the given media content can be determined by iterating through a plurality of different tiling scenarios to determine the tiling scenario that results in the reduced (or minimized) number of bytes that need to be stored for the given media content. In one specific example, each tiling scenario of the plurality of tiling scenarios includes different homogeneous segment sizes (that is, a first tiling scenario can have a first homogeneous segment size, a second tiling scenario can have a second homogeneous segment size, and a third tiling scenario can have a third homogeneous segment size, wherein each of the first second and third homogeneous segments sizes differ from each other).

In another example, optimal fine-grained homogeneous segments can be determined based upon which video quality level is used to encode the media content. In this regard, it is noted that certain embodiments described herein can extend the DASH (Dynamic Adaptive Streaming over HTTP) technique (e.g., to support the types of video streaming described herein). In DASH, a video is encoded with multiple visual quality levels, for example, 1 Mbps, 3 Mbps, 6 Mbps and 10 Mbps, which can be mapped (in this example) to 360p, 480p, 720p and 1080p resolutions. Certain conventional schemes leverage the estimation of network bandwidth to select the proper video quality. For instance, if the estimated throughput is 4 Mbps, the video encoded with 3 Mbps bitrate will be selected (e.g., by a video player). Based upon the estimated throughput and/or the selected bitrate, the optimal fine-grained homogeneous segments can be determined.

In another example, the heterogeneous segmentation can take into consideration the DASH process (e.g., the DASH video quality selection and/or the available network bandwidth). Suppose for a video encoded with 3 Mbps bitrate, there are 4 different homogeneous segmentation options—2×4, 4×8, 8×16 and 16×32. If tile-based streaming is used that downloads mainly tiles overlapping with a predicted viewport, the required throughput for these segmentation schemes could be (for example) 1.8 Mbps, 1.5 Mbps, 1 Mbps and 1.2 Mbps. The reason the required throughput first drops in this example for segmentations with finer granularity is that the non-visible area in the fetched tiles will be smaller. The required throughput will increase (in this example) from 1 Mbps to 1.2 Mbps because for smaller tiles the encoding efficiency may be lower (which introduces additional overhead). Given the required throughput, the homogeneous segmentation can be selected (in one example) using the following policy. Suppose the estimated bandwidth is 1.4 Mbps. Clearly the 2×4 and 4×8 segmentation schemes would not be chosen, as they require more bandwidth. Further, it would be preferable (in this example) to use 8×16 over 16×32 segmentation, because the former is more bandwidth efficient. In this scenario, the required bandwidth (and/or the selected video quality level) can be used in the determination of the heterogeneous segmentation. In a different scenario, assume the estimated throughput is 1.6 Mbps. Either 4×8 or 8×16 segmentation can be used in this example. Although the 4×8 segmentation requires more bandwidth (1.5 Mbps vs. 1 Mbps), it has a smaller number of tiles to decode on the client side and does not require mobile device with powerful decoding capability. Again, in this latter scenario, the required bandwidth (and/or the selected video quality level) can be used in the determination of the heterogeneous segmentation.

Figure 3:
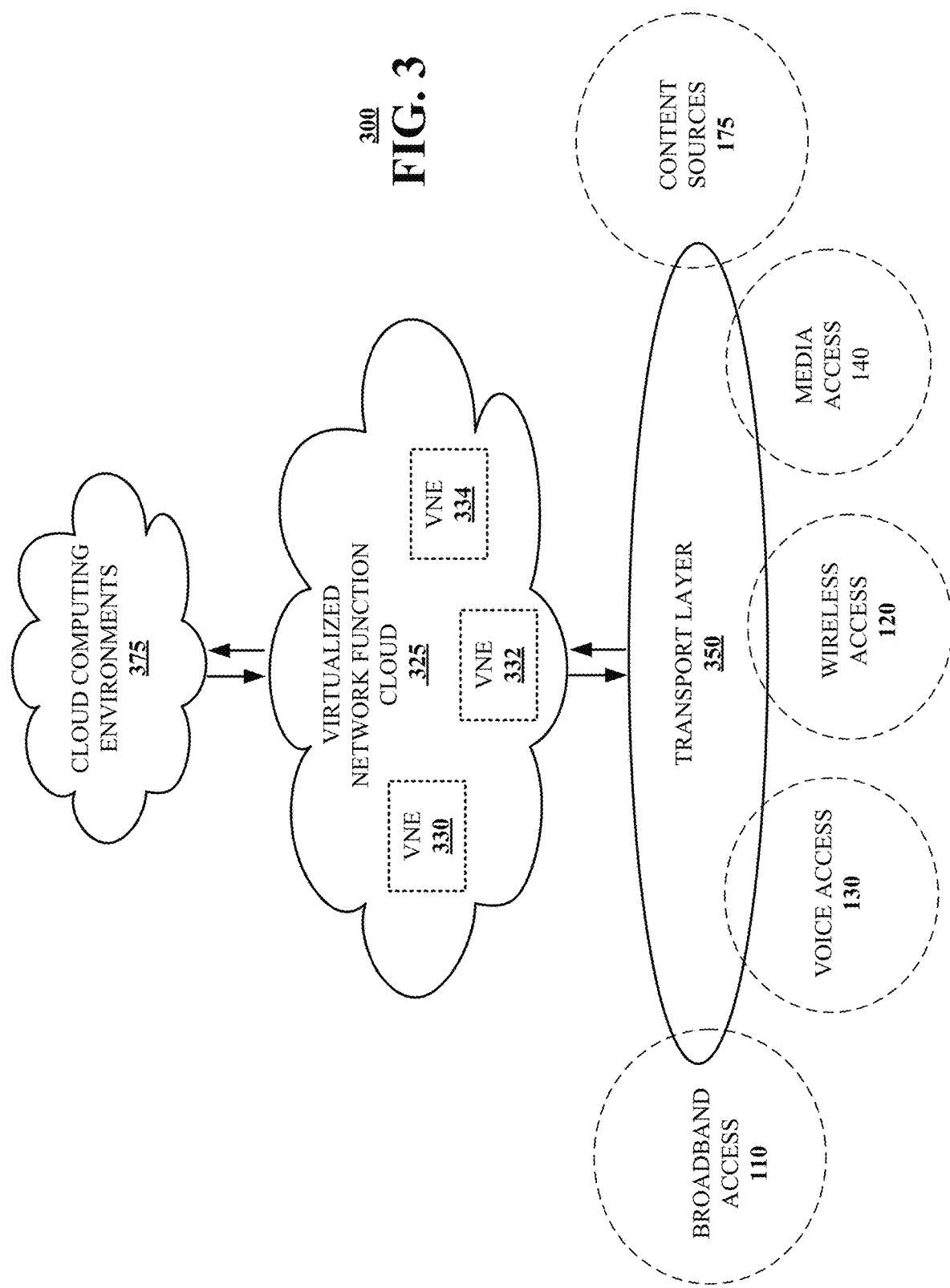
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of headset 204, the subsystems and functions of system 220, and methods 2010, 2030 and 2050 presented in FIGS. 1, 2A, 2C, 2J, 2K and 2L. For example, virtualized communication network 300 can facilitate in whole or in part streaming that utilizes heterogeneous segmentation (the video streaming can be, e.g., 180 degree video streaming, 360 degree video streaming, panoramic video steaming, immersive video streaming and/or spherical video streaming).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
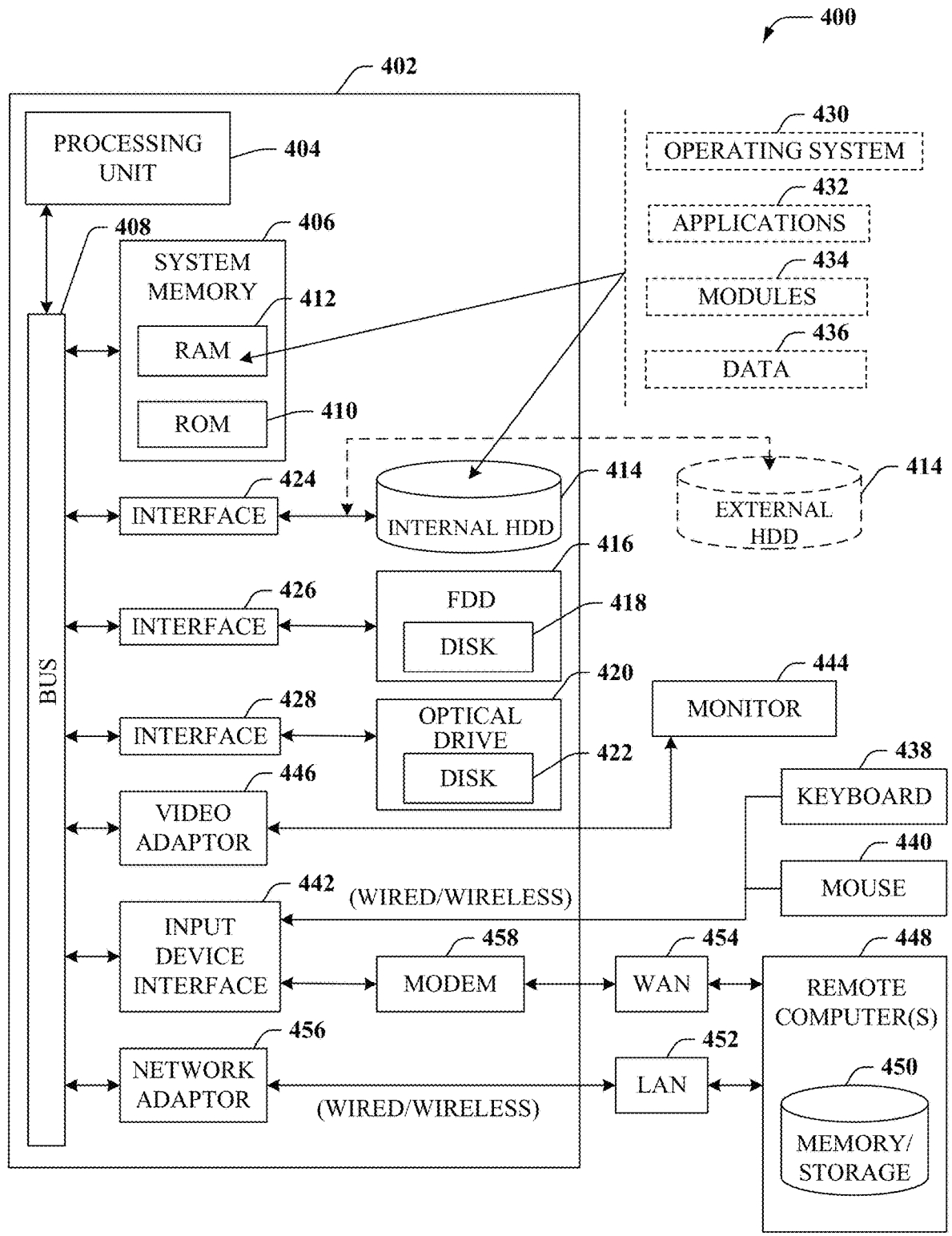
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part video streaming that utilizes heterogeneous segmentation (the video streaming can be, e.g., 180 degree video streaming, 360 degree video streaming, panoramic video steaming, immersive video streaming and/or spherical video streaming).

Generally, program modules comprise routines, programs, components, data structures, etc., that perform particular tasks or implement particular abstract data types.

Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
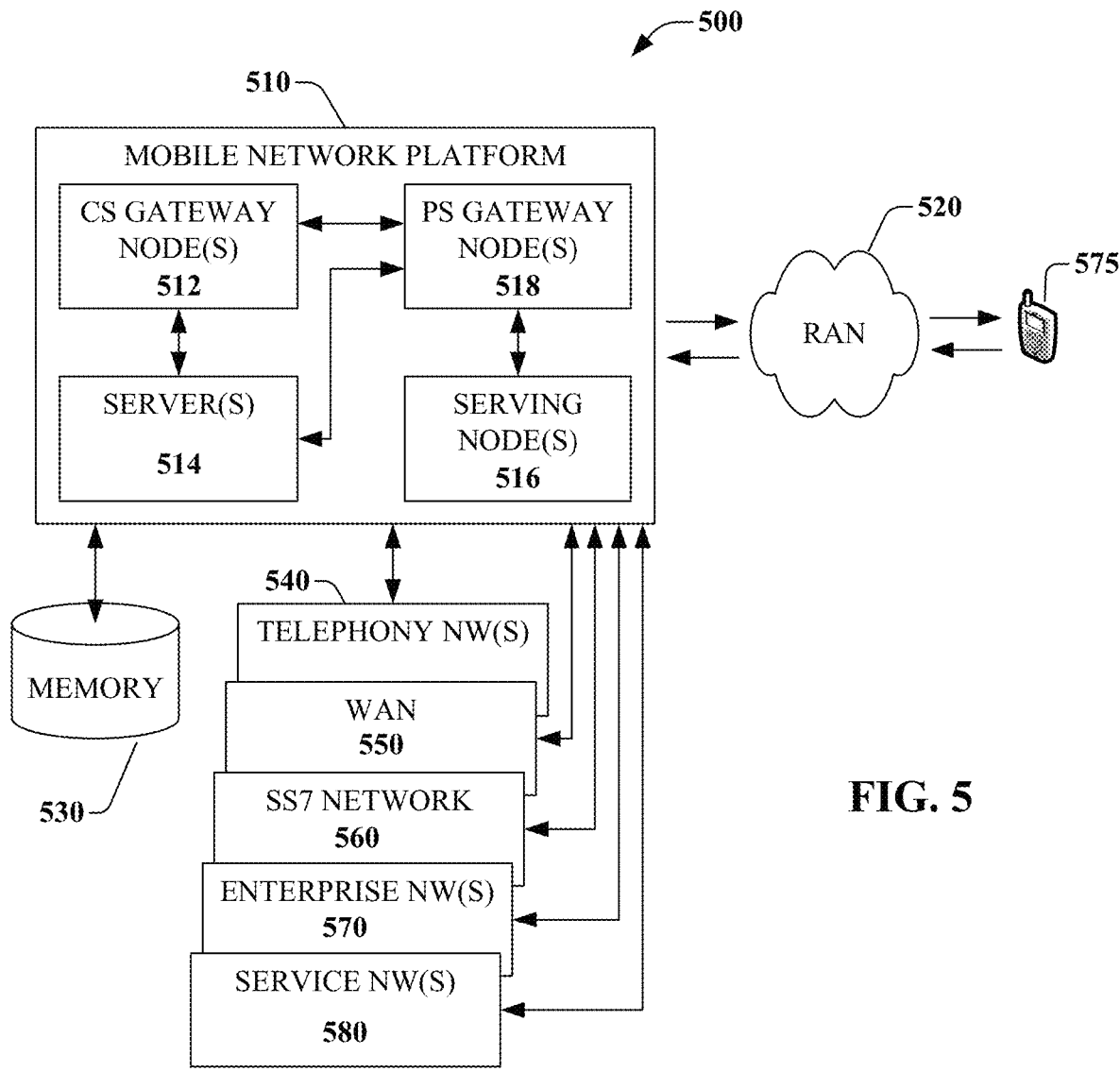
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part video streaming that utilizes heterogeneous segmentation (the video streaming can be, e.g., 180 degree video streaming, 360 degree video streaming, panoramic video steaming, immersive video streaming and/or spherical video streaming). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1($s$) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
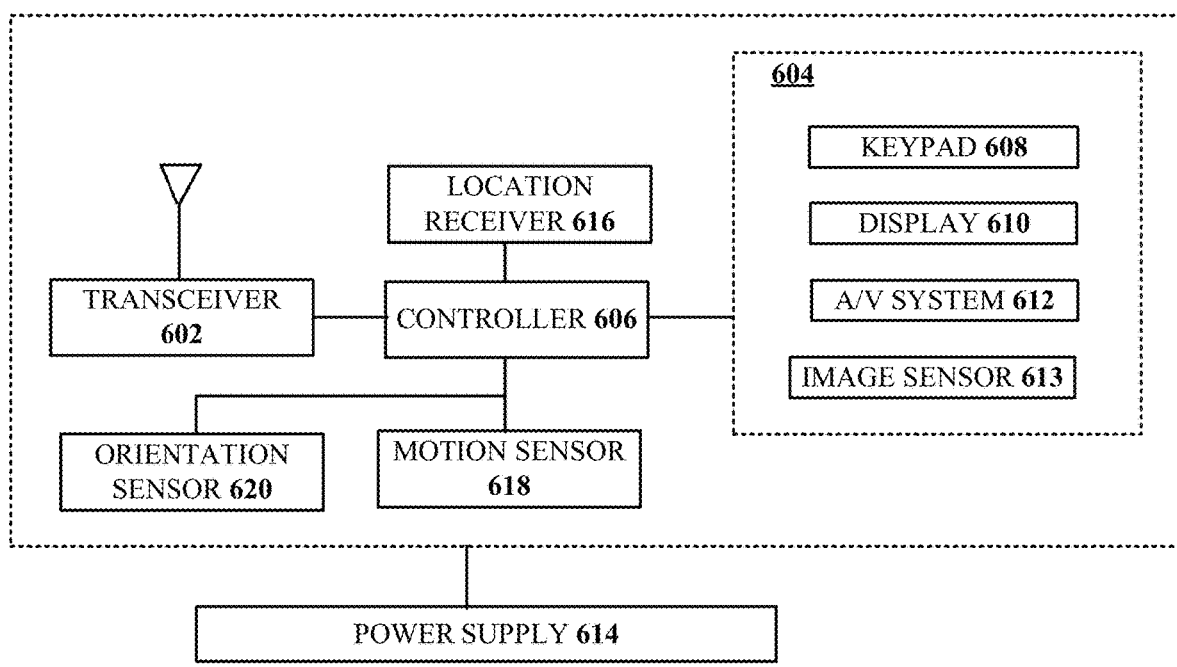
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part video streaming that utilizes heterogeneous segmentation (the video streaming can be, e.g., 180 degree video streaming, 360 degree video streaming, panoramic video steaming, immersive video streaming and/or spherical video streaming).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with video streaming that utilizes heterogeneous segmentation) can employ various AI-based schemes for carrying out various embodiments thereof. Moreover, the classifier can be employed to determine a ranking or priority associated with video streaming that utilizes heterogeneous segmentation. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, perform operations, the operations comprising:
obtaining data indicative, for a frame of a streaming video, of a field of view of a user;
determining from a set of homogeneous tiles of the frame of the streaming video a subset of the homogeneous tiles that covers the field of view of the user, each tile of the set of homogeneous tiles having a first area, the set of homogeneous tiles having been constructed for the frame of the streaming video based upon a bandwidth required to transmit some or all tiles of the set of homogeneous tiles at a given quality level, and the set of homogeneous tiles having been constructed prior to the obtaining of the data; and
merging at least a first tile of the set of homogeneous tiles and a second tile of the set of homogenous tiles into a larger tile, the larger tile having a second area that is greater than the first area, the merging being based upon at least a first parameter that is indicative of a first estimated network bandwidth required to support the given quality level, and the merging comprising merging only a portion of the first tile with at least the second tile into the larger tile.

2. The device of claim 1, wherein:
the merging only the portion of the first tile and at least the second tile into the larger tile comprises merging only the portion of the first tile, the second tile, a third tile of the set of homogeneous tiles and a fourth tile of the set of homogeneous tiles into the larger tile; and
each of the first tile, the second tile, the third tile and the fourth tile are adjacent to one another.

3. The device of claim 2, wherein the merging only the portion of the first tile, the second tile, the third tile and the fourth tile into the larger tile comprises merging only the portion of the first tile, only a second portion of the second tile, only a third portion of the third tile and only a fourth portion of the fourth tile into the larger tile.

4. The device of claim 1, wherein the set of homogeneous tiles has been optimally constructed for the frame of the streaming video based upon the tiles of the set of homogeneous tiles that are within a then-current field of view.

5. The device of claim 1, wherein the merging the portion of the first tile and at least the second tile comprises merging two horizontally adjacent tiles from the set of homogeneous tiles.

6. The device of claim 1, wherein the merging the portion of the first tile and at least the second tile comprises merging two vertically adjacent tiles from the set of homogeneous tiles.

7. The device of claim 1, wherein the streaming video is a 360 degree streaming video, a 180 degree streaming video, or any combination thereof.

8. The device of claim 1, wherein the device is a server and wherein the data is obtained from an end user video presentation device.

9. The device of claim 8, wherein the data comprises an identification of a plurality of tiles, of the set of homogenous tiles, that cover the field of view of the user.

10. The device of claim 8, wherein the operations further comprise providing to the end user video presentation device a set of heterogeneous tiles including the larger tile and one or more tiles from the subset of the homogeneous tiles that do not overlap the larger tile.

11. The device of claim 10, wherein the set of heterogeneous tiles covers the field of view of the user.

12. The device of claim 11, wherein the set of heterogeneous tiles is provided to the end user video presentation device responsive to the data being obtained from the end user video presentation device.

13. The device of claim 11, wherein the set of homogeneous tiles has been constructed based upon an estimated available network bandwidth.

14. The device of claim 1, wherein:
the data is obtained from an end user video presentation device; and
the first parameter comprises a minimization of an amount of tile data to be sent to the end user video presentation device in order to cover the field of view of the user.

15. The device of claim 1, wherein the device is a server, and wherein the operations further comprise:
providing to an end user video presentation device a set of heterogeneous tiles including the larger tile and one or more tiles from the subset of the homogeneous tiles that do not overlap the larger tile;
obtaining other data indicative, for another frame of the streaming video, of another field of view of the user, wherein the other data is obtained from the end user video presentation device;
determining from another set of homogeneous tiles of the another frame of the streaming video another subset of the homogeneous tiles that covers the another field of view of the user;
merging at least a third tile of the another set of homogeneous tiles and a fourth tile of the another set of homogenous tiles into another larger tile, wherein the merging is based upon at least a second parameter that is indicative of a second estimated network bandwidth required to support another given quality level, and wherein the second estimated network bandwidth required to support the another given quality level is different from the first estimated network bandwidth required to support the given quality level; and
providing to the end user video presentation device another set of heterogeneous tiles including the another larger tile and one or more tiles from the another subset of the homogeneous tiles that do not overlap the larger tile.

16. A non-transitory computer-readable storage medium comprising executable instructions that, when executed by an end user device including a processor, facilitate performance of operations, the operations comprising:
sending to a server data indicative, for a frame of a streaming video, a field of view of a user of the end user device, the server facilitating a determining from a set of homogeneous tiles of the frame of the streaming video a subset of the homogeneous tiles that covers the field of view of the user, each tile of the set of homogeneous tiles having a first area, the set of homogeneous tiles having been constructed for the frame of the streaming video based upon a bandwidth required to transmit some or all tiles of the set of homogeneous tiles at a given quality level, the set of homogeneous tiles having been constructed prior to the sending of the data, the server facilitating a merging of at least a first tile of the set of homogeneous tiles and a second tile of the set of homogenous tiles into a larger tile, the larger tile having a second area that is greater than the first area, the merging being based upon at least a parameter that is indicative of an estimated network bandwidth required to support the given quality level, and the merging comprising merging only a portion of the first tile with at least the second tile into the larger tile;
receiving, from the server, a set of heterogeneous tiles including the larger tile and one or more tiles from the subset of tiles that do not overlap the larger tile; and
presenting, based upon the set of heterogeneous tiles that is received from the server, an image to the user of the end user device.

17. The non-transitory computer-readable storage medium of claim 16, wherein:
the end user device comprises headgear that presents the image to the user;
the streaming video is a 360 degree streaming video, a 180 degree streaming video, or any combination thereof; and
the sending of the data to the server causes the server to send the set of heterogeneous tiles to the end user device.

18. The non-transitory computer-readable storage medium of claim 17, wherein the headgear comprises one of: goggles; glasses, virtual reality headgear, augmented reality headgear, or any combination thereof.

19. A method comprising:
- storing, by a processing system including a processor, a set of homogeneous tiles that has been constructed for a frame of a streaming video based upon a bandwidth required to transmit some or all tiles of the set of homogeneous tiles at a given quality level, each tile of the set of homogeneous tiles having a first area;
- determining, by the processing system, a frequently requested portion of the frame of the streaming video;
- obtaining by the processing system data indicative, for the frame of the streaming video, a current field of view of a user, the frequently requested portion having been determined by the processing system prior to the obtaining of the data indicative of the current field of view of the user;
- determining by the processing system, from the set of homogeneous tiles of the frame of the streaming video, a subset of the homogeneous tiles that covers the current field of view of the user, and the set of homogeneous tiles having been constructed prior to the obtaining the data; and
- merging, by the processing system, at least a first tile of the set of homogeneous tiles and a second tile of the set of homogenous tiles into a larger tile, the larger tile having a second area that is greater than the first area, the merging being based upon at least a first parameter, and the merging comprising merging only a portion of the first tile with at least the second tile into the larger tile.

20. The method of claim 19, wherein the data is obtained from an end user video presentation device, wherein the first parameter comprises a minimization of an amount of tile data to be sent to the end user video presentation device in order to cover the current field of view of the user, wherein the merging further comprises forming the larger tile based upon some or all pixels of the first tile and some or all pixels of the second tile, and wherein the method further comprises providing to the end user video presentation device a set of heterogeneous tiles including the larger tile and one or more tiles from the subset of tiles that do not overlap the larger tile.

* * * * *